Oct. 29, 1957   E. R. GAINES   2,811,277
PARTITIONED RECEPTACLE
Filed June 29, 1956   2 Sheets-Sheet 1
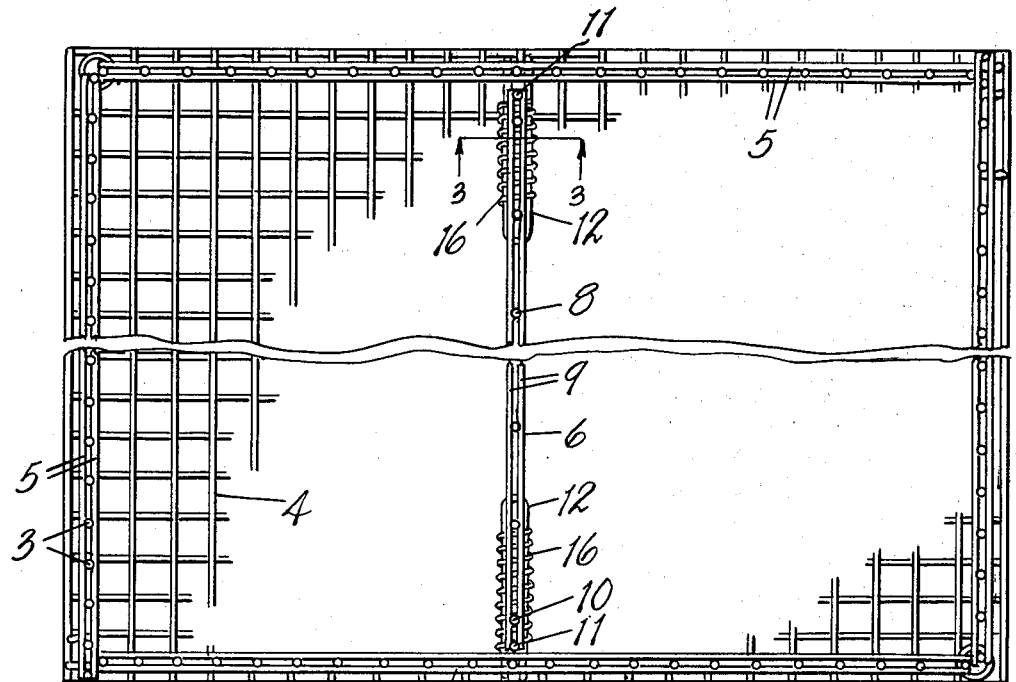
Fig. 1.
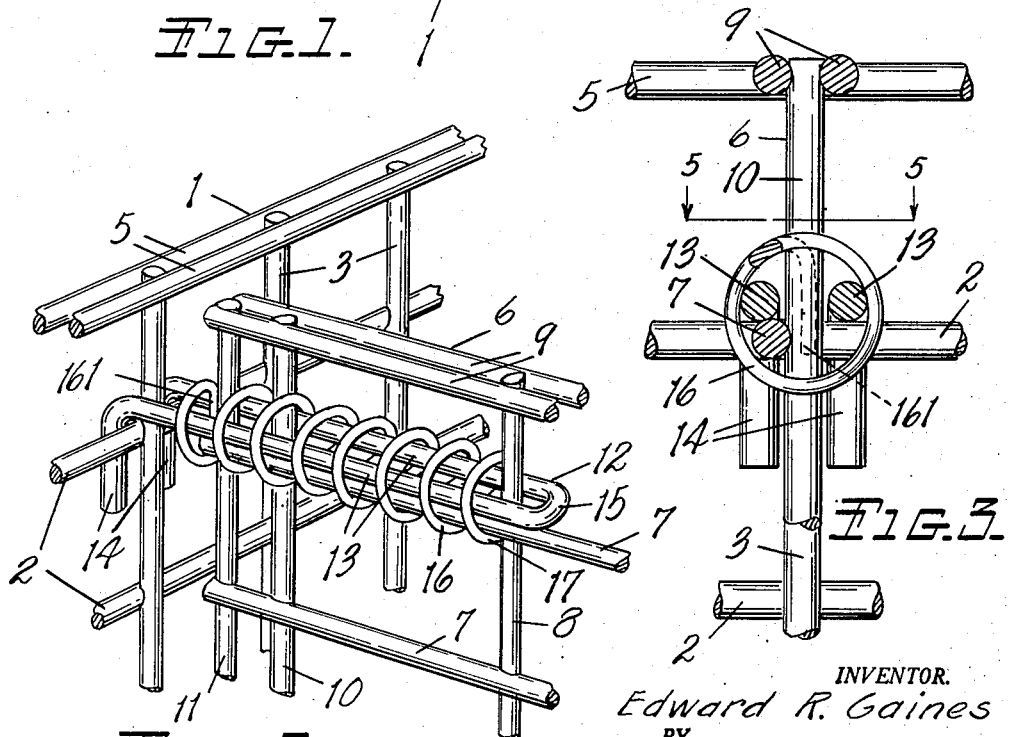
Fig. 2.
Fig. 3.
INVENTOR.
Edward R. Gaines
BY
Attorney.

Oct. 29, 1957  E. R. GAINES  2,811,277
PARTITIONED RECEPTACLE

Filed June 29, 1956  2 Sheets-Sheet 2

INVENTOR.
Edward R. Gaines
BY
Attorney.

United States Patent Office 2,811,277
Patented Oct. 29, 1957

2,811,277

PARTITIONED RECEPTACLE

Edward R. Gaines, Ludington, Mich.

Application June 29, 1956, Serial No. 594,907

9 Claims. (Cl. 220—19)

This invention relates to a partitioned receptacle particularly adapted for embodiment in pallets, skids and the like although having a wide range of uses.

The main objects of this invention are:

First, to provide a receptacle of the metal type comprising vertically spaced horizontal slats and laterally spaced vertical slats fixedly connected at their crossing point with a removable partition likewise comprising vertically spaced horizontal slats and laterally spaced vertical slats which may be quickly inserted and adjusted to compartmentize the receptacle.

Second, to provide a structure having these advantages in which the partition may be securely engaged with the grid-like walls of receptacles now in extensive use.

Third, to provide a partition having these advantages which is readily detachable and adjustable and very securely retained in its adjusted position and one which is capable of withstanding heavy thrust loads.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of a receptacle embodying my invention.

Fig. 2 is a fragmentary perspective view illustrating the relation of one of the wall engaging hooks of the partition to a wall.

Fig. 3 is an enlarged fragmentary view on a line corresponding to line 3—3 of Fig. 1.

Figure 4:
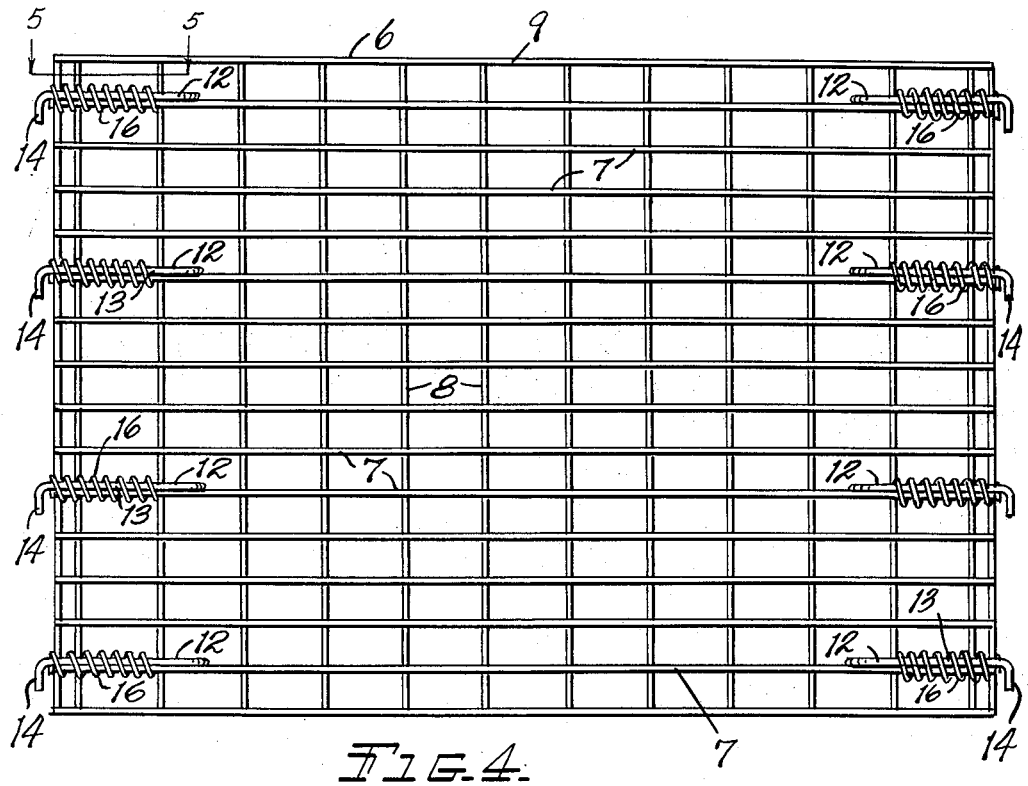
Fig. 4 is a side elevational view of the partition.

In the accompanying drawing I have illustrated my invention as embodied in a rectangular receptacle of the type including grid-like walls designated generally by the numeral 1, the walls comprising a plurality of vertically spaced horizontal slats 2 and a plurality of laterally spaced upright slats 3. The bottom 4 illustrated conventionally is of the grid type. These slats are commonly of heavy wire or light rod stock. In the embodiment illustrated the walls are provided with a pair of top border wires 5.

The partition designated generally by the numeral 6 comprises a plurality of vertically spaced horizontal slats 7 and a plurality of laterally spaced vertical slats 8. The slats of the walls and the partition are fixedly connected at their crossing points as by welding.

The partition is provided with a pair of top border wires 9 and it has a vertical reinforcing slat 10 disposed adjacent to but inwardly spaced from the end vertical slats 11. The partition is dimensioned to loosely fit between the opposed walls of the receptacle.

As shown in Fig. 1, the partition is centrally positioned but it should be understood that it is designed to be adjusted to any position between opposed walls and more than one partition may be used at the same time. In commercial practice receptacles of this type, for example, walled pallets or skids are used in various relation and it is frequently desirable to include two or more kinds of articles in the load. For example, two or more items which are designed to be assembled, and these commonly varying in size, it is desirable to provide a partition or partitions which may be adjusted to meet the particular requirements or conditions and the partition of my invention has that advantage.

Figure 5:
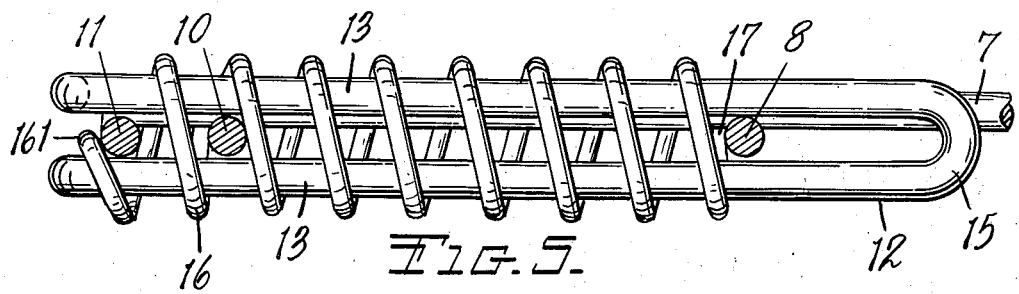
Fig. 5 is an enlarged fragmentary view in section on a line corresponding to line 5—5 of Fig. 3.

To support the partition in its adjusted position I provide a plurality of vertically spaced downwardly facing hooks 12, these being preferably formed of rod stock bent upon itself to position the shanks 13 of the hook members in laterally spaced parallel relation. The bills 14 of the hooks face downwardly, the bight 15 integrally connecting the hooked shanks at their inner end. The hooks are slidably mounted on horizontal slats, preferably in opposed pairs as is illustrated in Fig. 4. The hook shanks are slidably secured to the horizontal slats on which the hooks are mounted by means of coils 16 which embrace the shanks of the hooks and the horizontal slats and on which the hooks are slidably mounted quite closely but so as to permit sliding adjustment of the hooks from collapsed position, as is shown in Fig. 5 to engaged position as is shown in Fig. 2.

The outer ends 161 of the coils are looped around one of the hook member shanks and engaged with the outer vertical end slats of the partition. The inner ends 17 of the coils are disposed on the inner side of adjacent vertical slats thus slidably supporting the hooks and at the same time effectively securing the coils against longitudinal movement.

The shanks of the hooks are spaced to embrace one of the vertical wall slats when the hooks are engaged with a horizontal slat. This supports the partition against lateral thrust. The partition also serves as a tie member for the side walls. While the bight 15 is desirably somewhat spaced from the adjacent vertical slat 8 when the hook is in engaged position the bight will engage the vertical slats to prevent substantial springing movement or bulging of the side wall to which the partition is connected.

The partition may be quickly connected to the walls and when engaged the walls are very securely supported and serves as a support for the walls. It may be selectively adjusted to any desired position relative to the walls to which it is attached but it is desirably positioned so that the bills of the hook will straddle the vertical slats.

I have illustrated and described my invention in a highly practical embodiment thereof. I have not attempted to illustrate various adaptations which I contemplate as it is believed that this disclosure will enable those skilled in the art to embody or adapt my invention as may be desired.

Having thus described my invention, what is claimed as new and is desired to be secured by Letters Patent is:

1. In combination with, a receptacle including opposed parallel walls comprising a plurality of vertically spaced horizontal slats and a plurality of laterally spaced vertical slats, the horizontal and vertical slats being fixedly connected, of a partition comprising a plurality of vertically spaced horizontal slats and a plurality of laterally spaced vertical slats, the horizontal and vertical slats being fixedly connected, there being pairs of relatively closely spaced slats at the ends of the partition, and a plurality of downwardly facing vertically spaced hooks at each end of the partition disposed in opposably directed pairs, the hooks comprising spaced parallel hook members having shanks integrally connected at their inner ends and slidably supported on horizontal slats of the partition to project from the ends thereof for hooked engagement with horizontal slats of the receptacle walls in straddling laterally supported relation to upright slats thereof, coils embracing the shanks of said hooks and the horizontal slats with which the hooks are slidably associated, the outer ends of the coils being disposed on the outer sides of the end upright slats of the partition in supported relation thereto and the inner ends of the coils being disposed on the outer sides of adjacent upright slats thereby retaining the coils and slidably retaining the hooks, whereby the partition may be selectively positioned between the opposed walls of the receptacle and the hooks engaged with horizontal slats thereof in laterally supported relation to upright slats.

2. In combination with, a receptacle including opposed parallel walls comprising a plurality of vertically spaced horizontal slats and a plurality of laterally spaced vertical slats, the horizontal and vertical slats being fixedly connected, of a partition comprising a plurality of vertically spaced horizontal slats and a plurality of laterally spaced vertical slats, the horizontal and vertical slats being fixedly connected, and a plurality of downwardly facing vertically spaced hooks at each end of the partition disposed in opposably directed pairs, the hooks comprising spaced parallel hook members having shanks integrally connected at their inner ends and slidably supported on horizontal slats of the partition to project from the ends thereof for hooked engagement with horizontal slats of the receptacle walls in straddling laterally supported relation to upright slats thereof, coils embracing the shanks of said hooks and the horizontal slats with which the hooks are slidably associated, whereby the partition may be selectively positioned between the opposed walls of the receptacle and the hooks engaged with horizontal slats thereof in laterally supported relation to upright slats.

3. In combination with, a receptacle including opposed walls comprising a plurality of vertically spaced horizontal slats and a plurality of laterally spaced vertical slats, of a partition comprising a plurality of vertically spaced horizontal slats and a plurality of laterally spaced vertical slats, and downwardly facing hooks at each end of the partition comprising spaced parallel hook members having shanks slidably associated with horizontal slats of the partition to project therefrom for hooked engagement with horizontal slats of the receptacle walls in straddling laterally supported relation to upright slats thereof, coils embracing the shanks of said hooks and the horizontal slats with which they are slidably associated, the outer ends of the coils being disposed at the outer sides of the end upright slats of the partition in supported relation thereto and the inner ends of the coils being disposed on the outer sides of adjacent upright slats thereby retaining the coils and slidably retaining the hooks, whereby the partition may be positioned between the opposed walls of the receptacle and the hooks engaged with horizontal slats thereof in straddling laterally supported relation to upright slats.

4. In combination with, a receptacle including opposed walls comprising a plurality of vertically spaced horizontal slats and a plurality of laterally spaced vertical slats, of a partition comprising a plurality of vertically spaced horizontal slats and a plurality of laterally spaced vertical slats, and downwardly facing hooks at each end of the partition comprising spaced parallel hook members having shanks slidably mounted on horizontal slats of the partition to project therefrom for hooked engagement with horizontal slats of the receptacle walls in straddling laterally supported relation to upright slats thereof, whereby the partition may be positioned between the opposed walls of the receptacle and the hooks engaged with horizontal slats thereof in straddling laterally supported relation to upright slats.

5. In combination with, a receptacle including opposed walls comprising a plurality of vertically spaced horizontal slats and a plurality of laterally spaced vertical slats, of a partition comprising a plurality of vertically spaced horizontal slats and a plurality of laterally spaced vertical slats, and downwardly facing vertically spaced hooks at each end of the partition comprising spaced parallel hook members having shanks slidably mounted on horizontal slats of the partition to project therefrom for hooked engagement with horizontal slats of the receptacle walls in straddling laterally supported relation to upright slats thereof, whereby the partition may be positioned between the opposed walls of the receptacle and the hooks engaged with horizontal slats thereof in straddling laterally supported relation to upright slats.

6. In combination with, a receptacle including opposed walls comprising vertically spaced top and bottom and intermediate horizontal slats and spaced vertical slats, a partition adapted to be disposed between said opposed walls and comprising spaced horizontal and spaced vertical slats, and a plurality of downwardly facing vertically spaced hooks at each end of the partition disposed in opposed pairs and slidably mounted on horizontal slats of the partition to project from the ends thereof for hooked engagement with horizontal slats of said opposed receptacle walls, the hooks having spaced bills straddlingly engageable with vertical wall slats adjacent the juncture thereof with the horizontal slats with which the hooks are engaged.

7. In combination with, a receptacle including opposed walls comprising vertically spaced top and bottom and intermediate horizontal slats and spaced vertical slats, a partition adapted to be disposed between said opposed walls and comprising spaced horizontal and spaced vertical slats, and downwardly facing hooks at each end of the partition disposed in opposed pairs and slidably mounted on horizontal slats of the partition to project from the ends thereof for hooked engagement with intermediate horizontal slats of said opposed receptacle walls, the hooks having spaced bills straddlingly engageable with vertical wall slats adjacent the juncture thereof with the horizontal slats with which the hooks are engaged.

8. In combination with, a receptacle including opposed walls comprising spaced horizontal and spaced vertical slats, a partition adapted to be disposed between said opposed walls, and a plurality of downwardly facing vertically spaced hooks slidably mounted on the partition to project from the ends thereof for hooked engagement with horizontal slats of the said opposed walls and having spaced bills straddlingly engageable with vertical wall slats adjacent the juncture thereof with the horizontal slats with which the hooks are engaged.

9. In combination with, a receptacle including opposed walls comprising spaced horizontal and spaced vertical slats, a partition adapted to be disposed between said opposed walls, and downwardly facing hooks slidably mounted on the partition to project from the ends thereof for hooked engagement with horizontal slats of the said opposed walls and having spaced bills straddlingly engageable with vertical wall slats adjacent the juncture thereof with the horizontal slats with which the hooks are engaged.

References Cited in the file of this patent

UNITED STATES PATENTS

| | | |
|---|---|---|
| 2,239,482 | Cocks | Apr. 22, 1941 |
| 2,615,592 | Swedman | Oct. 28, 1952 |